United States Patent

[11] 3,592,535

| [72] | Inventor | Martin E. Gerry |
| | | 13452 Winthrope St., Santa Ana, Calif. 92705 |
| [21] | Appl. No. | 784,498 |
| [22] | Filed | Oct. 24, 1968 |
| [45] | Patented | July 13, 1971 |
| | | Continuation-in-part of application Ser. No. 644,022, June 6, 1967, now abandoned. |

[54] SOUND-SYNCHRONIZED CAMERA-PROJECTOR
14 Claims, 15 Drawing Figs.
[52] U.S. Cl. .................................................. 352/31,
95/12, 352/72, 353/15
[51] Int. Cl. ...................................................... G03b 31/04
[50] Field of Search ........................................... 353/15, 19,
120; 352/78, 26, 31, 12, 25, 37, 72; 179/100.2 Z,
100.2 T; 74/579; 95/12

[56] References Cited
UNITED STATES PATENTS

| 731,915 | 6/1903 | Kloboucnik | 74/579 |
| 3,337,694 | 8/1966 | Nakamatsu | 179/100.2 T |
| 3,389,953 | 6/1968 | Gerry | 353/15 |
| 2,406,152 | 8/1946 | Levine | 352/25 |
| 3,243,250 | 3/1966 | Keznickl | 352/12 X |
| 3,256,775 | 6/1966 | Hall | 352/37 X |
| 3,498,703 | 3/1970 | Gerry | 352/31 |
| 3,508,817 | 4/1970 | Hnilicka | 352/37 X |

Primary Examiner—John M. Horan
Assistant Examiner—Thomas H. Mauro

ABSTRACT: The invention deals with the addition of sound to a still camera and to a still camera-projector combination. Two basic variations include in one case a sound tape which is stationary with a scanning head for producing the sound, and in another case where for each photographic frame a given distance of tape is used to record and reproduce the sound; the sound is synchronized with each photographic frame so that a predetermined length of tape is used for each frame. Another feature is the use of a mechanically synchronized cam gear which has a number of high portions to permit the head to move to a different height with respect to the sound tape so that in effect the length of tape is effectively multiplied by the number of high portions on the cam gear. This allows a large quantity of photographic slides with sound to be stored in a small cartridge which is part of the invention. The cartridge is in two parts which disconnect from each other for developing the film part of the cartridge.

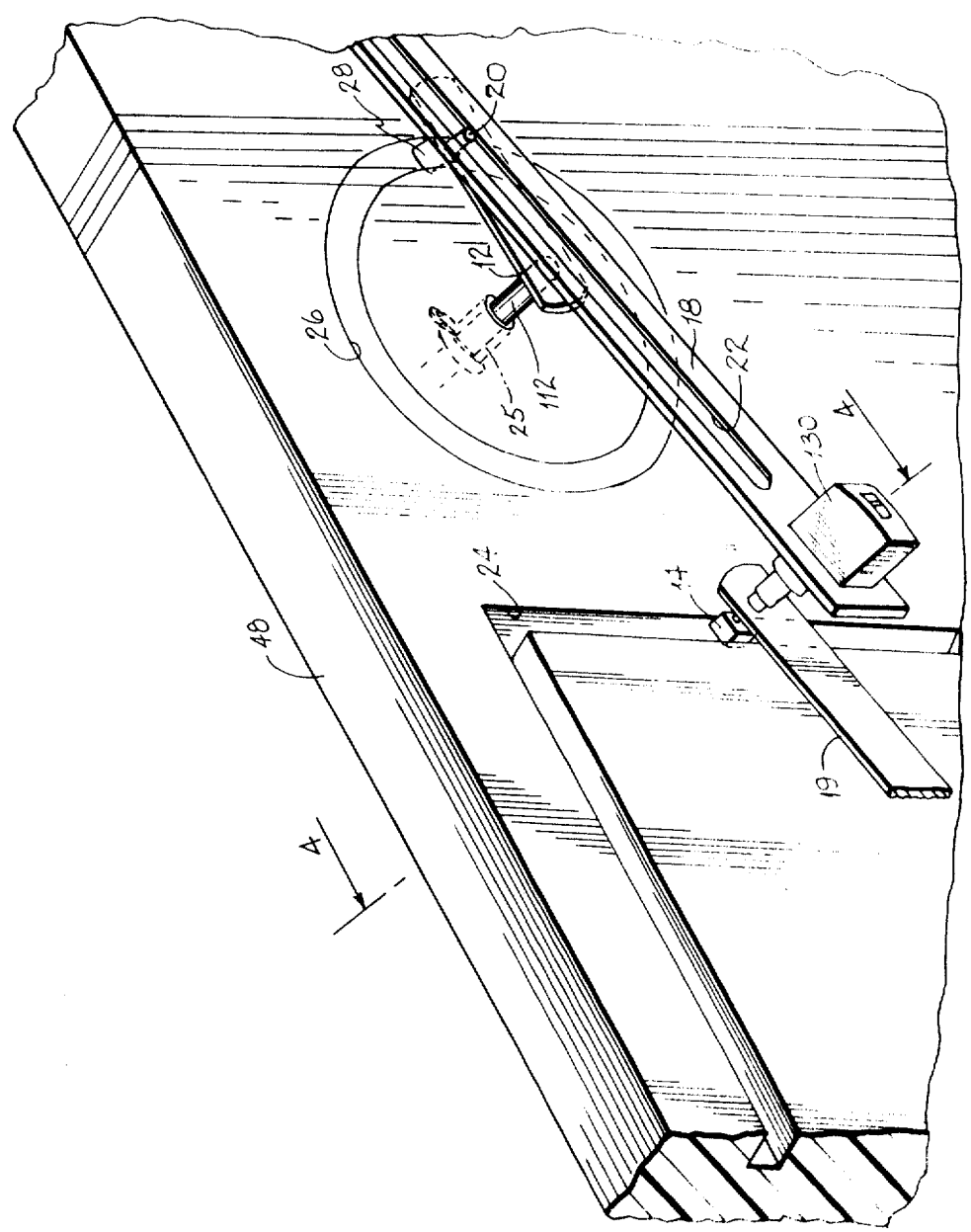

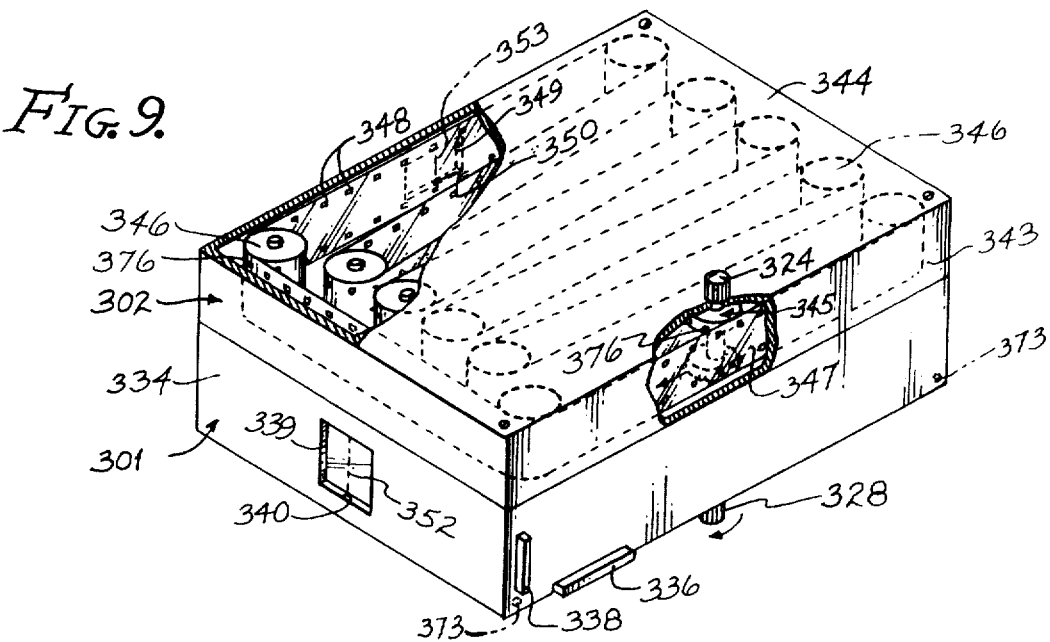
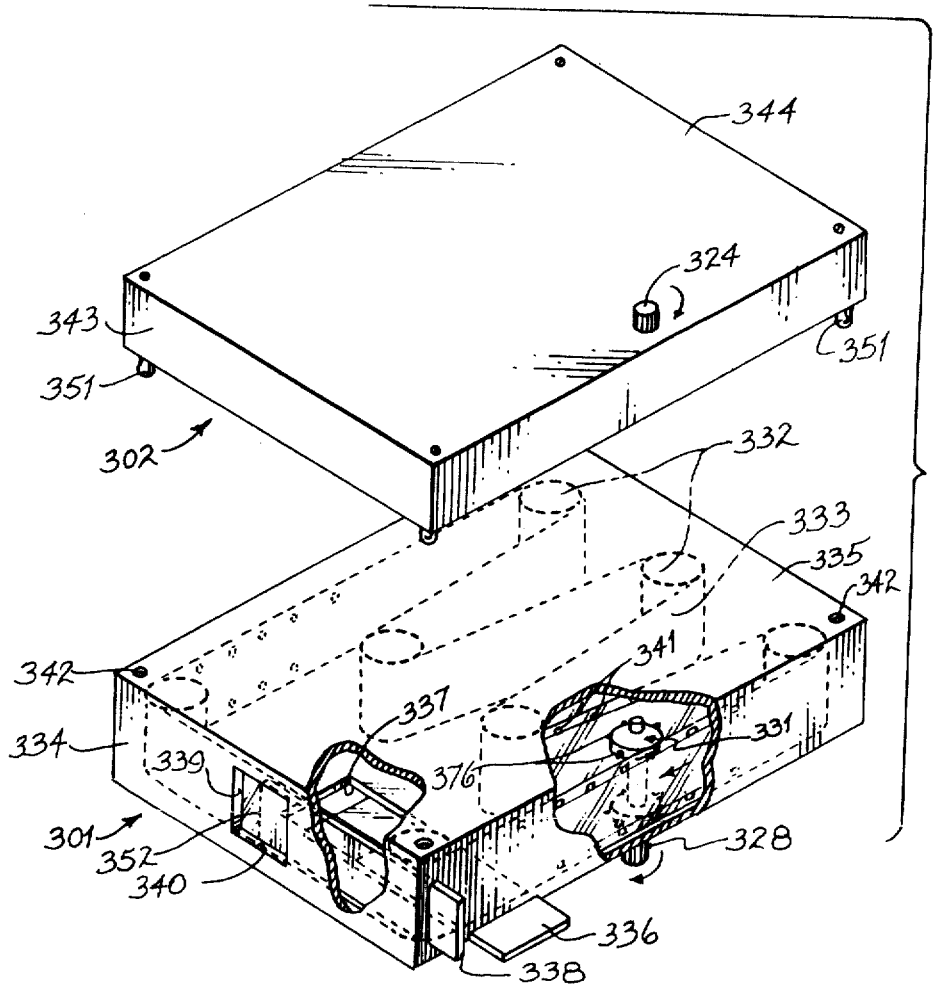

3,592,535

SOUND-SYNCHRONIZED CAMERA-PROJECTOR

COPENDING PARENT APPLICATION

This application is a continuation-in-part of pending application Ser. No. 644,022, filed June 6, 1967 now abandoned.

SUMMARY OF INVENTION

The invention relates to two configurations of a still camera-projector with sound and variations thereof. In both configurations a two-portion snap-together-type cartridge is used, one portion containing an endless film strip and the other portion containing an endless magnetic tape. The tape portion of the cartridge may therefore be sent to the laboratory for development of the film therein after photographing images on it and the film may be developed within the cartridge. Upon completion of development the two portions are snap fitted together for injection into either of the two configurations. The first configuration operates on the principle of translating equal portions of film and magnetic tape, referred to as frames, the magnetic tape frame being scanned by a mechanical scanner with a moving head, whereas the second configuration causes the film frame to advance first and a special gear on the magnetic tape drive motor shaft drives a quantity of tape past the head corresponding to the desired recording-reproducing time. The record-reproduce time therefore is a direct function of the special gear diameter. Also in the second configuration the effective length of the magnetic tape is increased by coupling a cam gear with a plural number of elevation portions to the tape drive motor shaft. The elevation portions cooperate with a follower at one end of a member urged against the surfaces of the elevation portions, the other end of the member being connected to the head, and the head is slidable on a rail so that when the cam gear is driven, the follower will dwell upon first one of the elevations and then upon another, and so forth, each time when elevations are changed the head moves to another elevation with respect to the tape width so that in effect the magnetic tape lengthened in proportion to the number of elevations of the cam gear. In the illustration, three elevations are shown indicating an effective multiplication of three times the record-reproduce time available. Hence the number of photographic frames can be increased proportionately within the same size cartridge. Another variation includes automatic programming of the photographic frames and accompanying sound tracks of the entire cartridge during the projection mode. Additionally, the first configuration has optionally a linear scanner of simple mechanical construction and which due to the linearity of scan gives better sound fidelity as compared to a spiral record-reproduce scan since the translation of the head distance on the tape is proportional to the angle of rotation of the drive motor shaft driving the scanner.

DRAWINGS

A more thorough understanding of the invention may be obtained by a study of the detailed specification taken in conjunction with the accompanying drawings in which:

FIG. 3 is a perspective view partially in cross section of a portion of the scanner panel with scanning members mounted thereon;

FIG. 9 is a perspective view partially in cross section of a composite two-portion cartridge;

FIG. 10 is a perspective view of the same cartridge as in FIG. 9 showing each of the two portions independently of each other;

STRUCTURAL RELATIONSHIPS OF THE GENERALLY LINEAR DISPLACEMENT SCANNER

Figure 1:
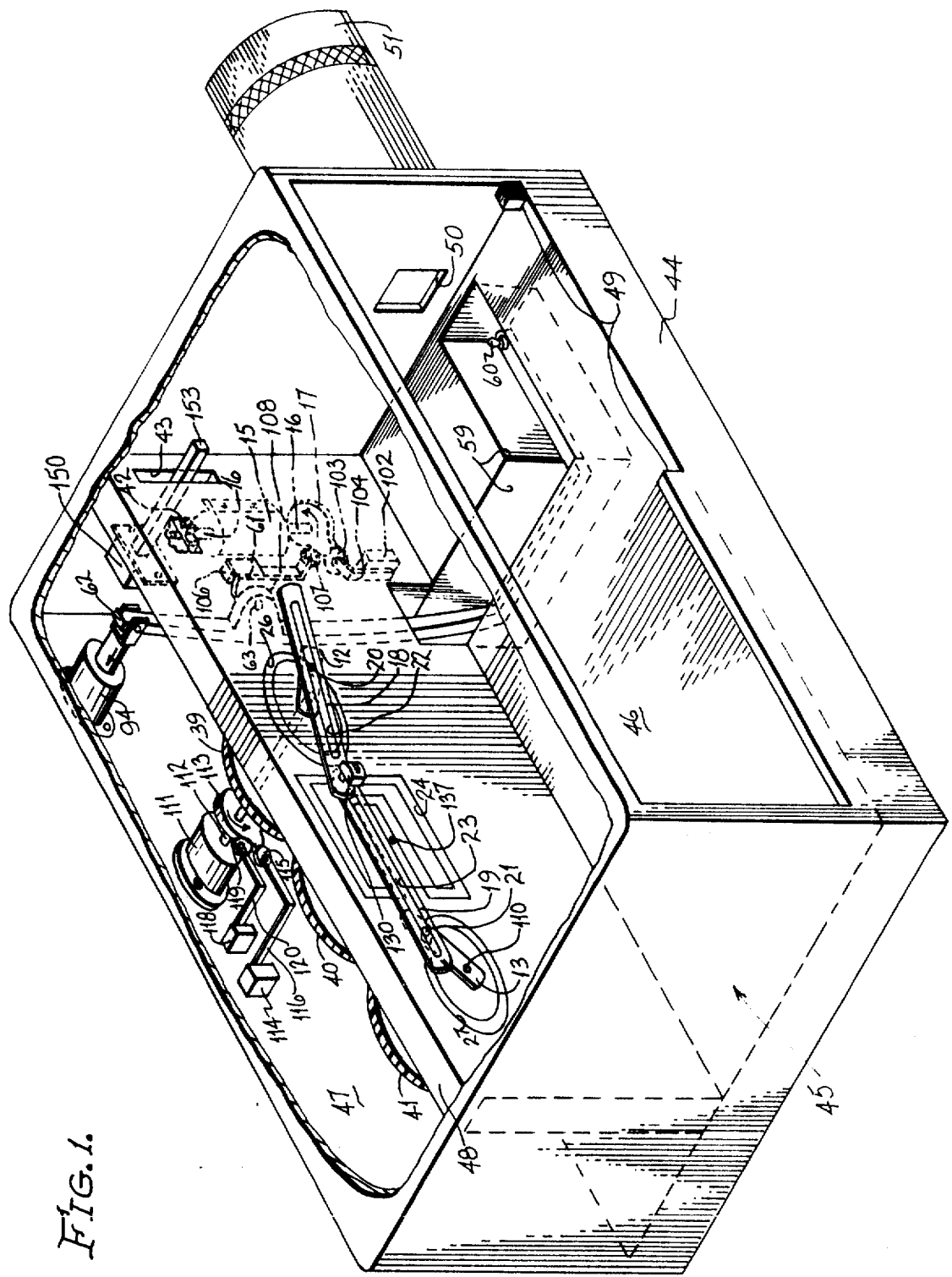
FIG. 1 is a perspective view partially in cross section of one configuration of the invention.

Referring to FIGS. 1, 3, 4A, 4B and 5, the Teflon panel 48 is mechanically affixed to base 44 and has track 24 for follower block 14 and right pitman arm follower track 26 routed out of panel 48. Small right pitman arm 12 has one end mechanically affixed to shaft 112 of scan motor 111, the other end of arm 12 has a hole through which extends pivot 20, follower roller 28 freely rotatable about a portion of pivot 20, is mounted thereon and is also rotatable in track 26 with which said roller 28 cooperates. Gear 39 is also mounted on shaft 112. Similarly, small left pitman arm 13 has one end mechanically affixed to shaft 110 which is also the mounting means for gear 41. The other end of arm 13 has a hole through which extends pivot 21 with a follower roller (not shown) identical in structure and function to that of roller 28, this roller cooperating with track 27. Right slidebar 18 having slot 22 therein, has pivot 20 extending into and through slot 22 for automatic positioning of pivot 20 within slot 22 as pitman arms 12 and 13 are rotated due to rotation of armature of motor 111, gears 39, 40 and 41. Gears 39, 40 and 41 engage each other and are driven by motor 111. The other end of arm 18 has a hole therein for mounting or cooperation with a multiaxial connector of head 130. Head 130 has either of two basic configurations of either head 130A or 130B. Head 130A has a coaxial connector comprised of center electrode 29 over which is fitted insulating member 33. Member 33 has a notch into which is press-fitted member 18 by inserting coaxial connector comprising of members 29 and 33 through this hole. When member 18 is seated it cooperates with electrically conductive curled edge of outer case 38. Magnetic material core 34 of either heads 130A or 130B is mechanically affixed to inner coaxial member 29 and has slot or air gap 36 therein and coil 35 wound thereon. In assembly of member 18 in its cooperating position with member 37, member 18 may have to be cut along a line bisecting the hole in which member 31 is inserted, parts 18, 31, 32, 37, 34, 35 and 36 assembled and member 18 portions braised or welded together along said bisecting line. One end of coil 35 is electrically connected to member 29 while in the matter of head 130A the other end is electrically connected to outer case 38. Head 130B has the identical inner member 29 but in addition has insulating sleeve 32 circumjacent a portion of member 29 about which is circumjacent electrically conductive outer coaxial member of substantially similar configuration and method of fitting thereon arm 18 as above described in connection with head 130A. The essential difference is that the outer case for head 130B is of plastic material, held in place between the end of arm 18 and curled edge of outer coaxial member 31. The core air gap and winding are identical to that of head 130A except that one end of winding 35 is electrically connected to inner coaxial member 29 while the other end is electrically connected to the curled edge of outer coaxial member 31. In both heads 130A and 130B, left slidebar 19 has a hole at one end therein through which is inserted member 29, and a slot 23 therein in which pivot shaft 21 extends through slot 23 and through a hole in left pitman arm 13. Identically to the relationship of members 18, 20, and 28 and track 26 is a similar configuration of pivot 21, a roller similar to roller 28 cooperating with track 27, member 19, and slot 23. Member 29 having a notch therein wherein member 19 is seated and in cooperative relationship therewith. However, in assembly of member 19 with the notch of member 29, member 19 may have to be heated so that it expands slightly for ease of insertion of member 29, thereafter member 19 shrinking back to its initial dimensions, the hole in said member 19 cooperating with the walls of the notch in member 29. Member 29 has a tapped hole at its axis for mounting thereto a cubically shaped block of Teflon material 14 by means of screw 30 so that block 14 may be moved in track 24 by the pitman arm assembly and prime moving means above described. Since track 24 is in Teflon panel 48 cooperating with block 14 surfaces, no friction virtually results when block 14 is moved due to the characteristics of Teflon; block 14 will be easily slideable in said track 24. The end of member 29 which inserts into a recessed portion of block 14 may be of square shape so that head 130A or head 130B may always be positioned in exactly the same way, namely tangential to the surface of sound tape 78. Pitman arm 13 is pivotable about pivot shaft 110 which also has mounted thereon gear 41 which is rotated by shaft 110. Gear 40 is mechanically affixed to pivot shaft 137 and the teeth of gear 39 cooperating with the teeth of gear 40, and the teeth of gear 40 cooperating with the teeth of gear 41 causes each gear of the entire gear train to rotate about its respective pivot shaft when motor 111 is energized. Gears 39, 40 and 41 enable positioning of members 12 and 13 in the proper phase relationship to each other and maintain these positions constantly. When the right set of arms are pushing against the head connector assembly, the left set of arms are pulling the connector assembly, thereby assuring unit linear displacement of block 14 in track 24 with specific angular rotation of pitman arms 12 and 13. To achieve this, the length between pivot 20 and the head assembly and the length between pivot 21 and the head assembly are made variable by the presence of slots 22 and 23 in members 18 and 19 respectively. Sleeve 25 has a solder lug as a part thereof for electrical connection of either head 130A or 130B, shown in FIG. 7 compositely as head 130. One sleeve 25 is mounted on shaft 112 and an identical sleeve is mounted on pivot shaft 110 so that electrical connection may be made from the head to movable contact 82 and common power and signal return 141. Other portions of the scanner comprise motor 111 mechanically affixed to backplate of compartment 47. Motor 111 has shaft 112 on which is mounted cam 113. Also mounted to backplate of compartment 47 are microswitches 114 and 118. Movable arm 116 of microswitch 114 has roller 115 which cooperates with the high portion of cam 113 in the normally inoperative mode of the apparatus. Movable arm 120 of microswitch 118 has roller 115 which cooperates with the low portion of cam 113 in the normally inoperative mode of the apparatus. For better electrical connection, if noise level generated due to motion of shafts in sleeves 25 cannot be tolerated, one pair of ends of beryllium copper springs 52 may be electrically connected by welding or soldering to member 29 and to the outer case 38 of head 130A, the other ends of each spring 52 electrically connected by welding or soldering to posts 53. Each of posts 53 may then be respectively electrically connected to movable contact 82 of switch 101 and to common power and signal return 141, instead of using sleeves 25 and their respective shafts as a means for electrical connection to the head.

Relationships involving the linear scanner with members 156, 157, 158, 159 and 160, and also involving the nonlinear scanner with members 166, 167, 168 and 169 will be explained below under titles of "Other Configurations of the Scanner" and in "Operational Relationships of Head Displacement Scanner."

OTHER CONFIGURATIONS OF THE SCANNER

Although FIGS. 1, 3, 6A, 6B and 6C illustrate the preferred configurations of the scanner and particularly its track 24, shown as generally of rectangular shape, it is conceivable that track 24 may have different shapes such as wedge shaped outline for use with a circular record wherein the record may be cut up into some 12 to 20 wedge shaped segments, each segment having a visual information slide at the outer periphery of the wedge and a sound track at the remaining portion of the wedge. It is therefor reasonable that a track similar in groove depth to track 24 but having a wedge shaped configuration would be needed in the Teflon panel 48; other shapes are equally adaptable. Further, it is obvious that slidebars 18 and 19, and pitman arms 12 and 13 may be replaced by linkages 157 and 158 and 160, and pitman arms 156 and 159, in the matter of the linear scanner, and in the nonlinear scanner by linkages 167 and 169, and pitman arms 166 and 168. In the linear scanner, pivot 164 linking linkages 157 and 158, describes a locus when the scanner is operated definable by joining points 201, 202, 203, 204, 205, 206, 207, 208, and back to 201. A scanner where the displacement of the head in track 24 would be nonlinear with respect to angular displacement of pitman arms is specifically shown in FIG. 6C. Angular rotation of pitman arms 166 and 168 causes motion of members 167 and 169 respectively and head 130 in nonlinear manner defined by loci 173 and 174 for pitman arms 166 and 168 respectively and by locus 176 comprising points 1, 2, 3, 4, 5, 6, 7, 8, and back to 1 for head 130. Head 130 is used to describe either head 130A or 130B. The description of the various scanners and their loci will be hereinafter given in a set of tables under the title of "Operational Relationships of the Head Displacement Scanner." Additionally, it is conceivable that heads such as 130A or 130B may have multiple windings, particularly magnetic modulation type heads or use of heads with multiple functions, or separate record, reproduce, or erase windings are desired. In these instances triaxial, four-axial, or multiaxial type of connectors with insulation means between each member of the connector and any other member of the connector, and the required number of pitman-slidebar, pitman-linkage, or beryllium copper springs as needed may be utilized to satisfy more complex head structure wherein the head is movable with respect to the recording medium such as magnetic tape or any magnetic planar surface member.

STRUCTURAL RELATIONSHIPS OF A FIRST CAMERA-PROJECTOR CONFIGURATION

Figure 7:
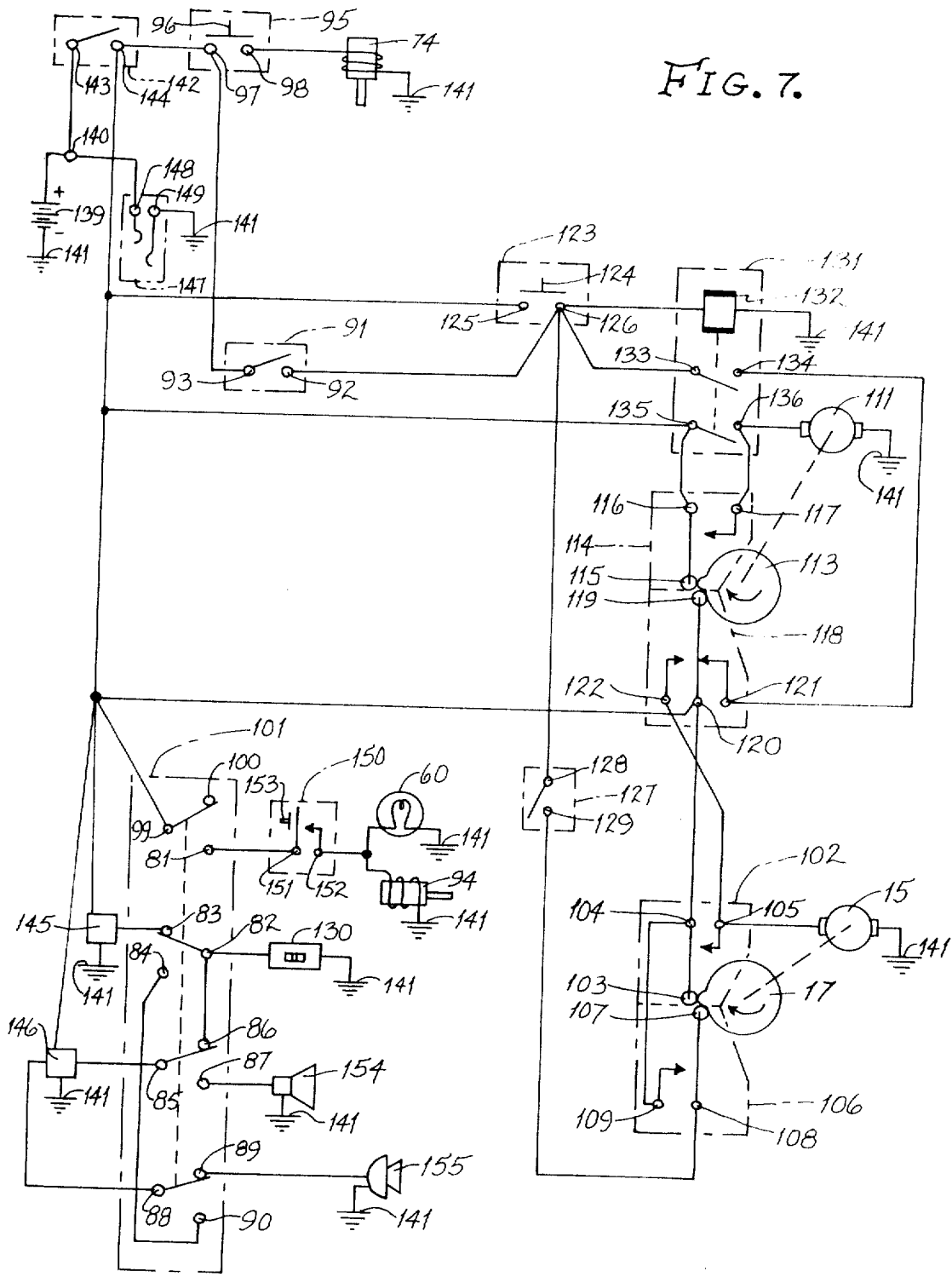
FIG. 7 is an electrical schematic of the first configuration of the subject invention showing the signal and control means therefor.

Referring to FIGS. 1 and 3, the camera-projector is comprised of base 44, case 45 which has front compartment 46 and rear compartment 47 formed by separator Teflon panel 48. Rear compartment 47 contains all the electronics as shown in FIG. 7 and as will be hereinafter described. Rear compartment 47 has mechanically mounted on the backplate of case 45, solenoid 94, the armature of which is pivotably coupled to projection lamp injection arm 62. Arm 62 is also pivotably mounted on pivot 63. Pivot 63 is mechanically affixed to bracket 61. Projection lamp 60 is mechanically affixed to the end of arm 62. The lower portion of arm 62 normally during inoperative or camera only mode, lies at the bottom of trough 59 in base 44. Frame advance motor 15 is mounted to panel 48 in compartment 47. This motor has a double ended shaft 16. The upper portion of shaft 16 has gear 42 mounted thereon which extends through a slot in panel 48 into compartment 46. The lower portion of shaft 16 has mounted thereon cam 17, the high portion of said cam 17 cooperating with roller 103 rotatably attached to movable contact 104 of microswitch 102. Microswitch 102 is attached to panel 48 in compartment 47. Microswitch 106 is mechanically affixed to bracket 61 and follower roller 107 rotatably attached to movable contact 108 of microswitch 106 is in cooperative relationship with the low portion of cam 17 during normally inoperative mode of the camera-projector and during substantially 355° of cam 17 rotation during the camera or projector mode of operation. Lamp inject microswitch 150 is mechanically attached to panel 48 in compartment 47 and extension 153 of microswitch 150 extends through slot 43 into compartment 46. The wall of case 45 has aperture 50 therein for communication of visual information therethrough and through optical lens and shutter assembly 51. In order that removable panel for base 54 of the cartridge retaining the audio and visual information tapes, to be hereinafter discussed, may be easily removable, cutout 49 in the lip of case 45 is provided therefor. This lip also retains the cartridge in the camera-projector after insertion therein. Extension 153 is for cooperation with cartridge case 55 so that microswitch 150 may be mechanically and automatically actuated when said case 55 is injected into compartment 46. Case 55 seating itself on base 44 and being held in proper position by the lip of case 45 in which cutout 49 exists. Upon injection of the cartridge gear 77 will cooperate and enmesh with the teeth of gear 42 for transportation of frames of tape when the proper control elements to be hereinafter described have been manually or automatically actuated.

It should be noted that details of the shutter mechanism having a bulb position to maintain constant light passage through the lens and shutter during projection of images as well as other details of the lens assembly are not shown herein inasmuch as these are standard camera components and not pertinent to the claims of the invention. For similar reasons, viewer and automatic shutter speed and range finding adjustment means are not shown.

STRUCTURAL RELATIONSHIPS OF THE CARTRIDGE TAILORED TO THE FIRST CONFIGURATION

Figure 2:
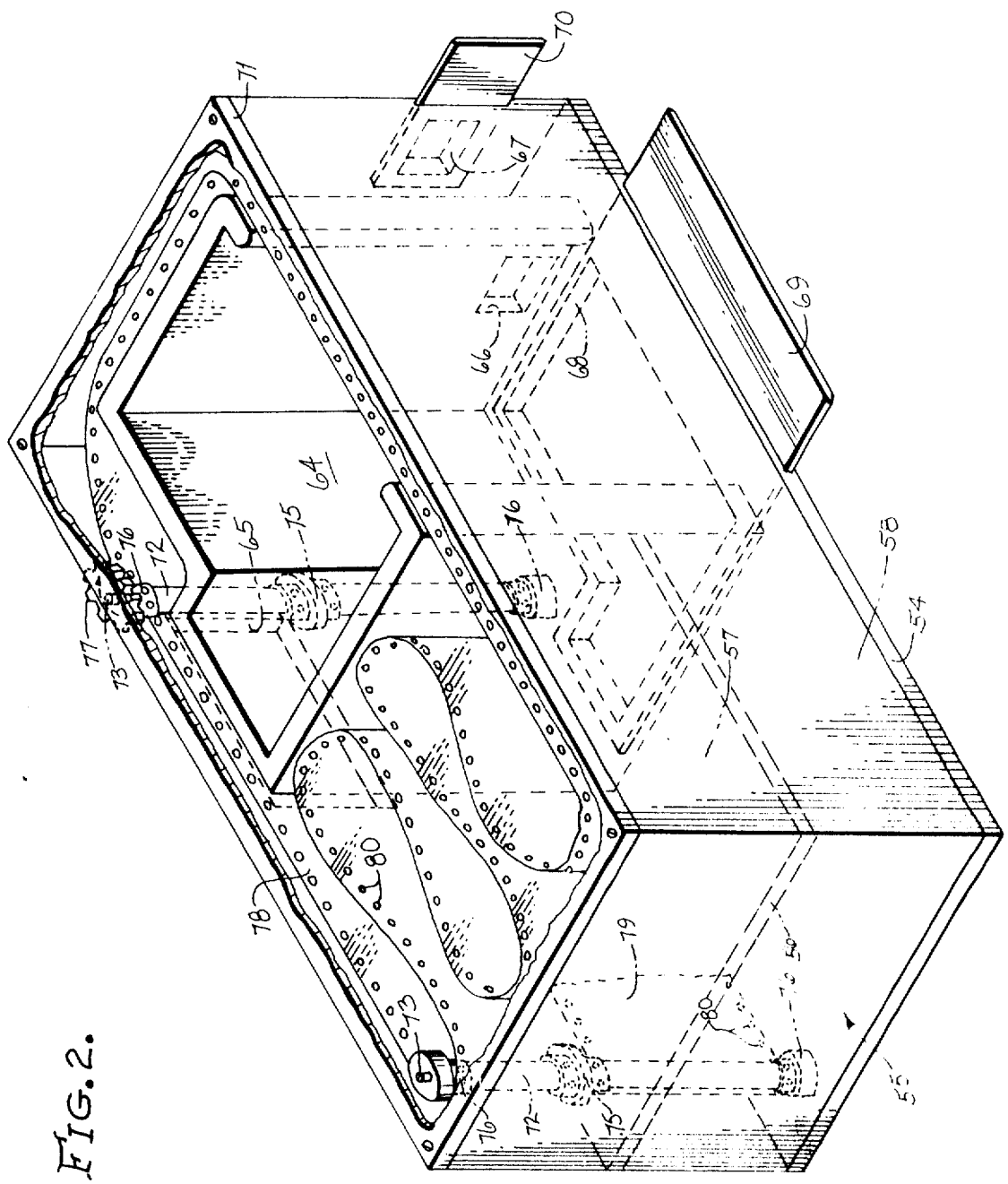
FIG. 2 is a perspective view partially in cross section of a cartridge tailored to the configuration of FIG. 1.
Figure 4A:
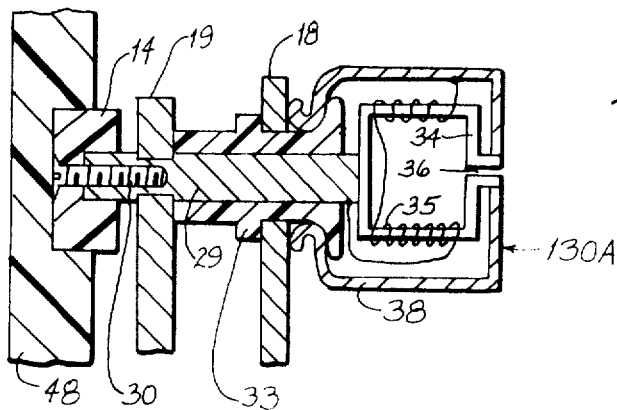
FIGS. 4A and 4B are cross section views of two configurations of scanning members taken along line 4-4 of FIG. 3.
Figure 4B:
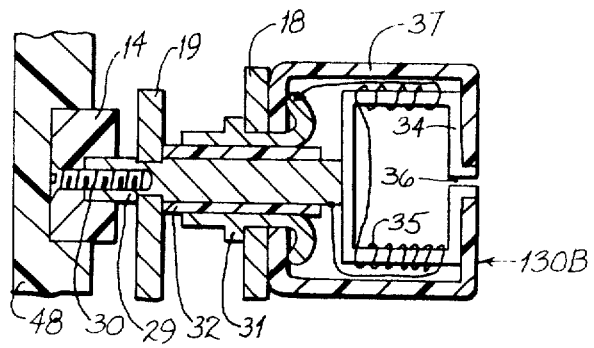
Figure 5:
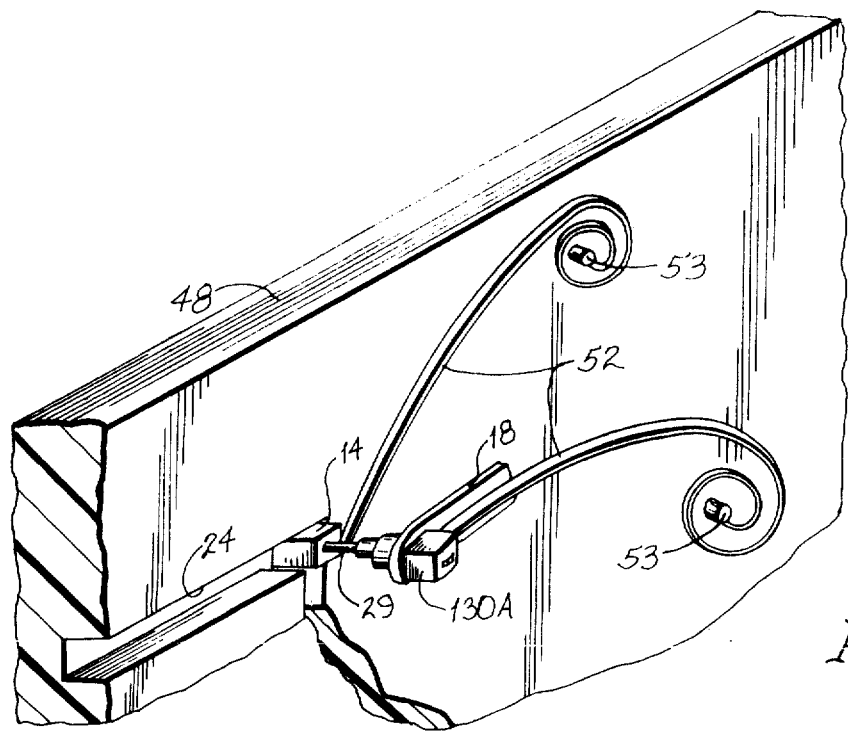
FIG. 5 is a perspective view partially in cross section of a portion of the scanner panel showing alternate means of making electrical connection to the record-reproduce head.

Referring to FIG. 2, the cartridge is comprised of case 55 mechanically attached to base 54 and having cover 71 mechanically attached to case 55. Separator panel 56 forms compartment 57 for retention of endless magnetic tape 78 and compartment 58 for retention of endless visual information tape 79. Separator panel 56 has holes therein just large enough for passing tape guide flange assemblies 75 therethrough, said assemblies 75 mechanically mounted on tape transport shafts 72. Shafts 72 have pivotable ends 73 at both ends thereof which are inserted in depressions of cover 71 and base 54. Shafts 72 also have tape guide flange assemblies 76 at both ends thereof. Assemblies 75 and 76 have sprockets thereon for cooperation with sprocket holes 80 for guiding audio and visual tapes 78 and 79. The right-hand shaft also has mounted thereon tape drive gear 77 which as described above will cooperate with gear 42 when cartridge is inserted into the camera-projector apparatus. Case 55 has aperture 65 therein for exposing one frame of magnetic tape and for acceptance of magnetic record-reproduce head 130, or versions 130A or 130B thereof. Projection lamp compartment 64 is formed by a modified U-shaped trough of plastic material which is moldably attached to base 54. One surface of the modified U-shaped trough acts as a backup against which tape 78 rests particularly when the record-reproduce head is in cooperation with surface of tape 78. The modified U-shaped trough has aperture 66 therein for communication of light therethrough and through aperture 67 of case 55 when panel 70 is removed. Base 54 has a cutout with V-grooves therein for admittance of panel 69 which has wedged tongues at both ends (edges) for cooperation and slidability in the V-grooves. Case 55 has V-grooves therein for cooperation with the wedged tongues of both edges of panel 70 and ease of slidability of said panel 70 in said V-grooves. When the cartridge has unexposed visual information tape therein and is not injected into the camera-projector, panels 69 and 70 are inserted completely into the cartridge to prevent any light from entering the cartridge prematurely and fogging the visual information film. When in use as a camera, panel 70 only is removed, panel 69 remaining fully injected. When in use as a projector, panel 69 as well as panel 70 are removed so as to permit projection lamp 60 to be injected into and past aperture 68 in base 54 for communication of light through apertures 66 and 67 and subsequently through aperture 50 and the shutter and lens assembly 51. Tapes 78 and 79 are stretched taut between the two tape transport shafts 72 having tape guide holes 80 cooperating with sprockets on flange assemblies 75 and 76 and the remainder of tapes 78 and 79 are stored in a zigzag pattern in the cartridge, passing back and completing the loop of endless tape along the wall of case 55 opposite to the wall next to which shafts 72 are installed. The passing of one frame each of tapes 78 and 79 occurs manually or automatically when gear 77 is driven by gear 42 of the camera-projector apparatus. It should be noted that loading of visual information tape occurs in a dark room with base 54 removed therefrom and then closed by screws provided therefor while audio tape is inserted in the upper portion of the cartridge with cover 71 removed therefrom and then closed by screws provided for this purpose.

SEPARATE CONSIDERATION OF A CAMERA DERIVATION FROM THE FIRST CAMERA-PROJECTOR CONFIGURATION

Referring to FIGS. 1 and 2, it becomes obvious that by elimination of the trough 59, injection arm 62, projection lamp 60, solenoid 94, microswitch 150, cam 17, microswitch 102 and microswitch 106, that the camera-projector and cartridge may become simply a camera for still pictures with a sound track for each picture.

ELECTRICAL RELATIONSHIPS OF THE FIRST CAMERA-PROJECTOR CONFIGURATION

Referring to FIGS. 1, 2, and particularly FIG. 7, the electrical schematic shows the components of the camera-projector apparatus in the normally power-off mode. All electrical connections will be made by means of wire and hence it will not be necessary to refer to the fact that wire is used in making these connections. Positive input means of rechargeable battery 139 is electrically connected to positive power input terminal 140, the negative terminal of battery 139 being electrically connected to common negative power and signal return means 141. Means 140 is electrically connected to movable contact 143 of switch 142 and to positive terminal 148 of jack 147. Jack 147 is for connection of an external DC power converter for recharging battery 139 and for operating the projector portion from standard AC power input means. The external AC to DC rectifier is a standard part and is not shown. Common power and signal return means 141 is also electrically connected to shutter activate solenoid 74, return of relay coil 132, return of motor 111, return of motor 15, return of projection lamp 60, return of projection lamp injection solenoid 94, return of record-reproduce head 130, return of loudspeaker 154, return of microphone 155, return of modulator oscillator 145, return of record-reproduce amplifier 146, and to terminal 149 of DC power input jack 147. Stationary contact 144 of switch 142 is electrically connected to stationary contact 97 of shutter operate pushbutton 95, to stationary contact 125 of scan activate pushbutton 123, to movable contact 135 of scan control relay 131, to movable contact 120 of automatic frame transport activate microswitch 118, to movable contact 99 of record-photograph and reproduce-project switch 101, to DC power input terminal of modulator oscillator 145, and to DC power input terminal of record-reproduce amplifier 146. Stationary contact 142 is electrically connected to movable contact 93 of shutter and scan toggle switch 91. Stationary contact 98 of shutter operate pushbutton 95 is electrically connected to high side of shutter activate solenoid 74. Stationary contact 92 of switch 91 is electrically connected to stationary contact 126 of pushbutton 123. Stationary contact 126 is electrically connected to the high side of coil 132 of scan control relay 131. Stationary contact 126 is electrically connected to movable contact 133 of relay 131 and to movable contact 128 of automatic sequence frame advance program switch 127. Stationary contact 129 of switch 127 is electrically connected to movable contact 108 of automatic sequencing microswitch 106. Stationary contact 134 of relay 131 is electrically connected to stationary contact 121 of automatic frame transport activate microswitch 118. Stationary contact 136 of relay 131 is electrically connected to input or high side of motor 111 and to stationary contact 117 of motor synchronizing microswitch 114. Stationary contact 135 of relay 131 is electrically connected to movable contact 116 of microswitch 114. Stationary contact 122 of microswitch 118 is electrically connected to stationary contact 105 of frame advance motor synchronizing microswitch 102. Movable contact 120 of microswitch 118 is electrically connected to movable contact 104 of microswitch 102. Movable contact 104 is electrically connected to stationary contact 109 of automatic sequencing microswitch 106. Stationary contact 105 of microswitch 102 is electrically connected to the input or high side of frame advance motor 15. Stationary contact 81 of switch 101 is electrically connected to movable contact 151 of projection lamp inject microswitch 150. Stationary contact 152 of microswitch 150 is electrically connected to the input or high sides of projection lamp 60 and projection lamp injection solenoid 94. Output of modulator oscillator 145 is electrically connected to stationary contact 83 of switch 101. Movable contact 82 of switch 101 is electrically connected to stationary contact 86 of switch 102 and to input or high side of record-reproduce head 130. Output of record-reproduce amplifier 146 is electrically connected to movable contact 85 of switch 101. Stationary contact 84 of switch 101 is electrically connected to stationary contact 90 of switch 101. The input of record-reproduce amplifier 146 is electrically connected to movable contact 88 of switch 101. Stationary contact 87 of switch 101 is electrically connected to the input or high side of loudspeaker 154. Stationary contact 89 of switch 101 is electrically connected to the input or high side of microphone 155. Microphone 155 being in fact two microphones in parallel at the front and rear of the camera-projector case for sound recording from object being photographed or legend related to the photograph being mad by user of the camera-projector through rear microphone.

All contactors of switches, microswitches, pushbuttons, and scan control relay are shown normally open except contact 121 of microswitch 118 which normally cooperates with movable contactor 120 to provide holding power means for relay 131. Switch 101 is shown in the record-photographic (camera) mode. Dotted lines connecting the movable contactors of switch 101 and the movable contactors of relay 131 indicate simultaneous transfer from the position shown in FIG. 7 to the other position.

OPERATIONAL RELATIONSHIPS OF THE HEAD DISPLACEMENT SCANNER

Figure 6A:
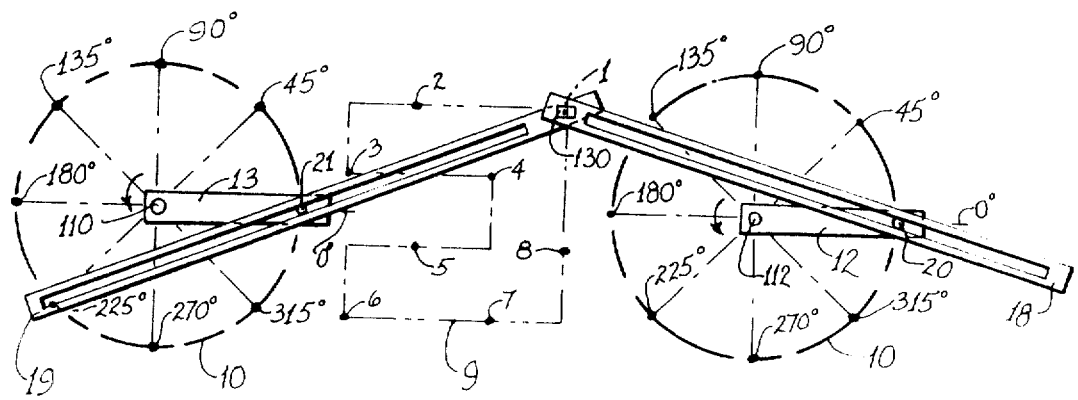
FIG. 6A is a mechanical schematic showing one form of a generally linear scanner with scanner member positions related to the record-reproduce head translation.
Figure 6B:
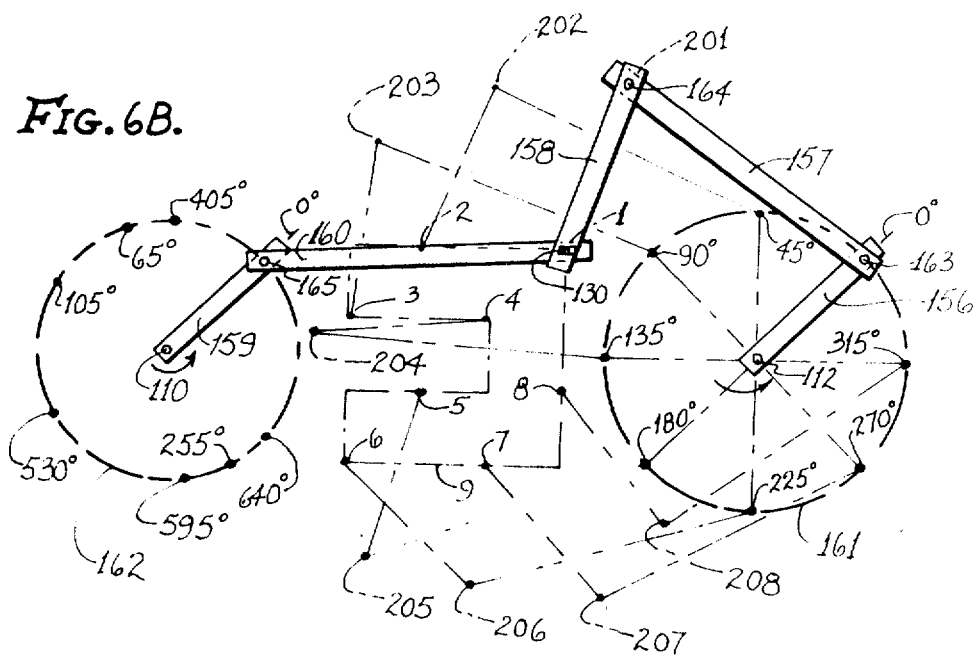
FIG. 6B is a mechanical schematic showing another form of a linear scanner with scanner member positions related to the record-reproduce head translation.
Figure 6C:
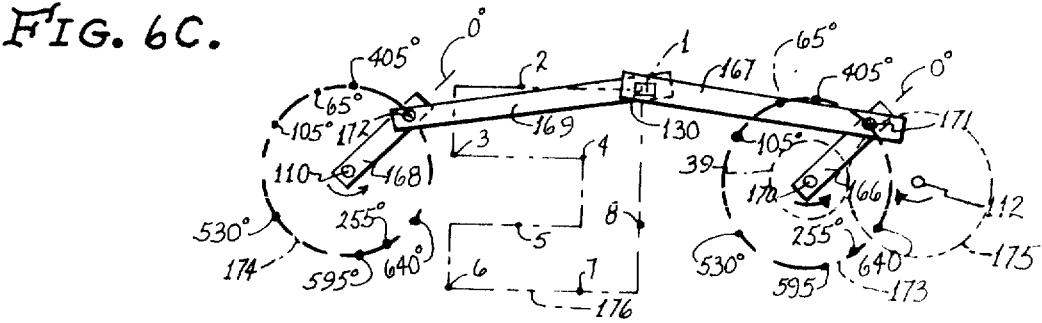
FIG. 6C is a mechanical schematic showing a nonlinear scanner with scanner member positions related to the record-reproduce head translation.

Referring to FIGS. 1, 2, 3, and particularly to FIGS. 6A, 6B and 6C, it may be seen that in the generally linear scanner, pitman arms 12 and 13 have constant length and when driven by motor 111 these arms describe circles shown as loci 10. Since rotation is shown counterclockwise and since arms 12 and 13 are always in phase with each other and since one end of each of slidebars 18 and 19 are pivotably attached at the record-reproduce head 130, and have slots 22 and 23 respectively in arms 18 and 19 so that the distances between pivots 20 or 21 and the head location along locus 9 vary with rotation angles of arms 12 or 13 respectively. This variation in effective slidebar lengths makes possible the generally linear displacement of head 130 by translation of track follower block 14 in track 24 or otherwise describable by locus 10 for pivots 20 or 21 and locus 9 for block 14. The distances between points 1 and 2, 2 and 3, 3 and 4, 4 and 5, 5 and 6, 6 and 7, 7 and 8, and 8 and 1, are substantially the same. Therefore, if displacement of head 130 occurs for each increment distance corresponding to every 45° angular rotation of arms 12 or 13, then the head 130 will displace linearly or proportionately thereto. It should be noted in examining FIG. 6A that the resultant forces produced upon head connector means due to torques on arms 12 and 13 are towards the head in one of the head linkages and away from the head in the other of the head linkages, enabling constant translation of the head in the path given by locus 9.

Examination of FIG. 6B will disclose fixed linkages rather than slidebar types. In using this configuration, gears 39, 40 and 41 are removed, and only the right-hand set of arms and linkages operates the scanner. Shaft 112 drives member 156 in a counterclockwise direction thereby driving linkages 157 and 158. Member 156 is pivotable coupled to member 157 by pivot 163, member 157 is pivotably coupled to member 158 by pivot 164 and the end of member 158 is pivotably coupled to a multiaxial head connector. Also connected to this multiaxial connector is member 160 which is pivotably connected to member 159 by means of pivot 165. Inasmuch as gears 39, 40 and 41 are removed, pivot shaft 110 is used to pivot member 159, providing a circular locus 162 and retaining sleeve and solder lug member 25 thereon. Similarly, shaft 112 retains member 25 thereon as well as pivoting member 156 to trace a circular locus 161. Members 156 and 159 are initially in-phase, but the angular displacement of member 159 is not linear or the same as that of member 156 which is displaced angularly along locus 161 proportional to head 130 displacement along locus 9 as above described. The movement of track follower 14 and consequently the displacement of head 130 from locations 1 to 2, 2 to 3, 3 to 4, 4 to 5, 5 to 6, 6 to 7, 7 to 8, and 8 to 1, with corresponding locus of pivot 164 described by a line connecting locations 201, 202, 203, 204, 205, 206, 207, 208 and 201. Pivot 164 may have rotatably mounted thereon a follower roller similar to roller 28 in panel 48, and said roller similar to 28 in a track of similar depth to that of track 26 but having a contour which follows the locus described by connecting together locations 201 through 208 for more positive guidance. It should be noted that during rotation of 360° of pitman arm 156 describing locus 161, pitman arm 159 will be rotated 720° describing locus 162. This configuration is more positive and is the preferred configuration of the scanner assembly.

Examination of FIG. 6C discloses a very simple scanner drive means but nonlinear in head 130 displacement with respect to pitman arm members. Pitman arm members 166 and 168 are identical and linkage arms 167 and 169 are identical to each other, arms 167 and 169 being pivotably connected to multiaxial connector of head 130. Pitman arm 166 is pivoted about pivot 170 describing locus 173 and pitman arm 168 is pivoted about pivot shaft 110 describing locus 174. Here gears 40 and 41 are removed, gear 59 being the only gear remaining and mounted on pivot shaft 170. Motor 111 has mounted thereon gear 175 which is twice the diameter of gear 39, so that one revolution of gear 175 provides two revolutions of gear 39. Locus 173 is the path described by pivot 171 when arm 166 is rotated. Shaft 110 has also mounted thereon sleeve member 25, and shaft 170 has sleeve member 25 also mounted thereon. Shaft 112 here has all the components mounted thereon including cam 113. Microswitch 118 however is shifted in position so that its follower roller 119 cooperates with the first low portion directly after the high portion of cam 113 so that microswitch 118 is activated after 355° of cam 113 rotation. This is necessary because cam 113 is now being rotated opposite to the direction arrow thereon due to the addition of gear 175. The prime movement is provided by motor 111 driving gear 175 which drives gear 39 which in turn through the linkages described causes head 130 to be translated along locus 176.

The relationships of the members of the scanners are tabulated as follows:

TABLE A.—RELATIONSHIPS OF COMPONENTS IN CONFIGURATION OF FIGURE 6A

| Location head 130 | Degrees left side-pitman arm 19 | Degrees right side-pitman arm 18 |
|---|---|---|
| 1 | 0 | 0 |
| 2 | 45 | 45 |
| 3 | 90 | 90 |
| 4 | 135 | 135 |
| 5 | 180 | 180 |
| 6 | 225 | 225 |
| 7 | 270 | 270 |
| 8 | 315 | 315 |

TABLE B.—RELATIONSHIPS OF COMPONENTS IN CONFIGURATION OF FIGURE 6B

| Location head 130 | Degrees left side-member 159 | Degrees right side-member 156 | Location pivot 164 |
|---|---|---|---|
| 1 | 0 | 0 | 201 |
| 2 | 65 | 45 | 202 |
| 3 | 105 | 90 | 203 |
| 4 | 255 | 135 | 204 |
| 5 | 405 | 180 | 205 |
| 6 | 530 | 225 | 206 |
| 7 | 595 | 270 | 207 |
| 8 | 640 | 315 | 208 |

TABLE C.—RELATIONSHIPS OF COMPONENTS IN CONFIGURATION OF FIGURE 6C

| Location head 130 | Degrees left side-member 168 | Degrees right side-member 166 |
|---|---|---|
| 1 | 0 | 0 |
| 2 | 65 | 65 |
| 3 | 105 | 105 |
| 4 | 255 | 255 |
| 5 | 405 | 405 |
| 6 | 530 | 530 |
| 7 | 595 | 595 |
| 8 | 640 | 640 |

OPERATIONAL RELATIONSHIPS OF FIRST CAMERA-PROJECTOR CONFIGURATION

Referring to FIGS. 1, 2, and 7, conditions for the camera mode will first be discussed. Upon insertion of the cartridge into the camera-projector, gear 77 cooperates with gear 42 and extension 153 of microswitch 150 is pushed back by the cartridge case into slot 43 thereby causing cooperation of contacts 151 and 152 of microswitch 150. Panel 70 is then removed to permit communication of visual information through aperture 67. Switch 142 is manually operated causing cooperation of contacts 143 and 144 and applying power from battery 139 to the scanner shutter control means, the record-reproduce means, and the tape transport means. Switch 101 shown in FIG. 7 in the camera-record mode, it is seen that power is not available for application to microswitch 150 and hence to projection lamp 60 and solenoid 94. In this mode, contacts 83 and 82 cooperate thereby providing excitation signal to head 130 and to the output of amplifier 146 since there is cooperation between contacts 86 and 85. Contacts 88 and 89 cooperate permitting the electrical connection of microphone 155 to be made to the input of amplifier 146 thereby allowing voice intelligence to be recorded on a portion of the surface of tape 78 (a frame) by means of recording head cooperating with said tape 78, said head being moved by the scanner in a pattern described by locus 9. Microswitch 118 is shown in the normally scanner inoperative mode in which case contact 120 cooperates with contact 121 permitting power to be applied to holding contact 134 of relay 131 during this mode and substantially throughout 355° of cam 113 rotation during scanner activation.

When pushbutton 95 is manually momentarily depressed contactor 96 cooperates with contacts 97 and 98 thereby applying power to solenoid 74 actuating the shutter means (not shown and not needed as shutter is conventional shutter) for photographing the image on a frame of tape 79. Pushbutton 123 is then momentarily normally depressed causing relay 131 to be energized and holding contacts 133 and 134 thereby cooperating and holding said relay closed. Contacts 135 and 136 also cooperate thereby energizing motor 111 which drives cam 113. Contacts 116 and 117 are then energized holding motor 111 electrically energized until substantially 355° of cam 113 rotation is completed. During this period the scanner is driven, the head follows track 24 from location point 1 through location point 8 and part of the distance back to location point 1. At completion of 355° of cam 113 rotation, the high portion of cam 113 cooperating with follower roller 119 causes contacts 120 and 121 to cease cooperating thereby releasing holding contacts 133 and 134 due to power removal and causing relay contacts 135 and 136 to open, ceasing cooperation. However, contacts 116 and 117 still cooperate for 5° still remaining of cam 113 rotation, maintaining power on motor 111 until completion of the remaining 5°; at the same time head 130 is returned in the remaining portion of track 24 until it reaches point 1 location. But power is momentarily transferred by cooperation of contacts 120 and 122 to motor 15 which is energized thereby rotating and driving cam 17 as well as driving gears 42 and 77 for 360° of cam 17 rotation and advancing tapes 78 and 79 synchronously, one frame at a time. Here too, rotation of the armature of motor 15 for 360° is guaranteed due to the fact that contacts 104 and 105 cooperate until cam 17 again is back to its initial preoperative position. At 355° of cam 17 rotation, contacts 108 and 109 cooperate momentarily due to the high portion of cam 17 cooperating with follower roller 107 thereby applying power to contact 129 of switch 127. Switch 127 is usable for automatically sequencing the next-in-line frames of tapes 78 and 79 during the projector mode operation and will be discussed later in this connection.

Getting back to the initial action of operating pushbutton 95, if prior thereto switch 91 were to have been closed causing cooperation of contacts 92 and 93, then the simultaneous start of operation of the scan cycle would have been affected by manually momentarily depressing pushbutton 95 only, without the necessity of also depressing pushbutton 123. The remainder of the scan cycle would be identical as above described beginning with the time when relay 131 is energized; in this instance by pushbutton 95 simultaneously also causing shutter activation due to the energizing of solenoid 74.

Insofar as the reproduce-project mode is concerned, and 70 would both be removed. Panel 70 for light communication through aperture 67 and panel 69 to enable projection lamp 60 to be automatically injected into aperture 68 so that tape 79 would be circumjacent projection lamp compartment 64 and projection lamp 60 would be positionable in compartment 64 behind aperture 66. Switch 101 would then be opposite to that shown in FIG. 7 and contact 99 would cooperate with contact 83 permitting power to be applied through cooperating contacts 151 and 152 to projection lamp 60 and solenoid 94. Armature of solenoid 94 moves in the direction of arrow thereon, said armature pivotably attached to injection arm 62 and pulling projection lamp injection arm 62, said arm pivoting about pivot 63 to move upward in trough 59 and raise projection lamp 60 so it is positioned adjacent to aperture 66. Contact 82 cooperates with contact 84, contact 84 cooperates with contact 87, and contact 88 cooperates with contact 90, thereby connecting head 130 to input of amplifier 146 and loudspeaker 154 to output of amplifier 146, and disconnecting modulator oscillator 145. The operation of the scanner is identical in the record-photograph mode to that described above for the reproduce-project mode. Pushbutton 95 and switch 96 are never used in the reproduce-project mode. When one frame at a time is desired to be reproduced and projected, pushbutton 123 is momentarily manually depressed, switch 127 being open with contacts 128 and 129 not cooperating. However, when automatic sequencing is desired, switch 127 is closed causing contacts 128 and 129 to cooperate and pushbutton 123 is then momentarily manually depressed. Automatic sequencing of frames along with scanning each sound frame while projecting each visual frame will occur thereafter until switch 127 is opened causing contacts 128 and 129 to cease cooperating at which time whichever frame is being projected along with the associated scanned sound track frame, that particular sound and visual frame set will be completed and the apparatus will stop, restoring relay 131, motors 111 and 15 and their switching means to the normal position shown FIG. 7. It is therefore reasonable and desired that switch 127 will be opened during the showing of the last visual and sound frame combination of tapes 78 and 79, so that automatic stopping of the apparatus would be accomplished on completion of the showing of all the frames in the cartridge.

STRUCTURAL RELATIONSHIPS OF A SECOND CAMERA-PROJECTOR CONFIGURATION

Figure 8:
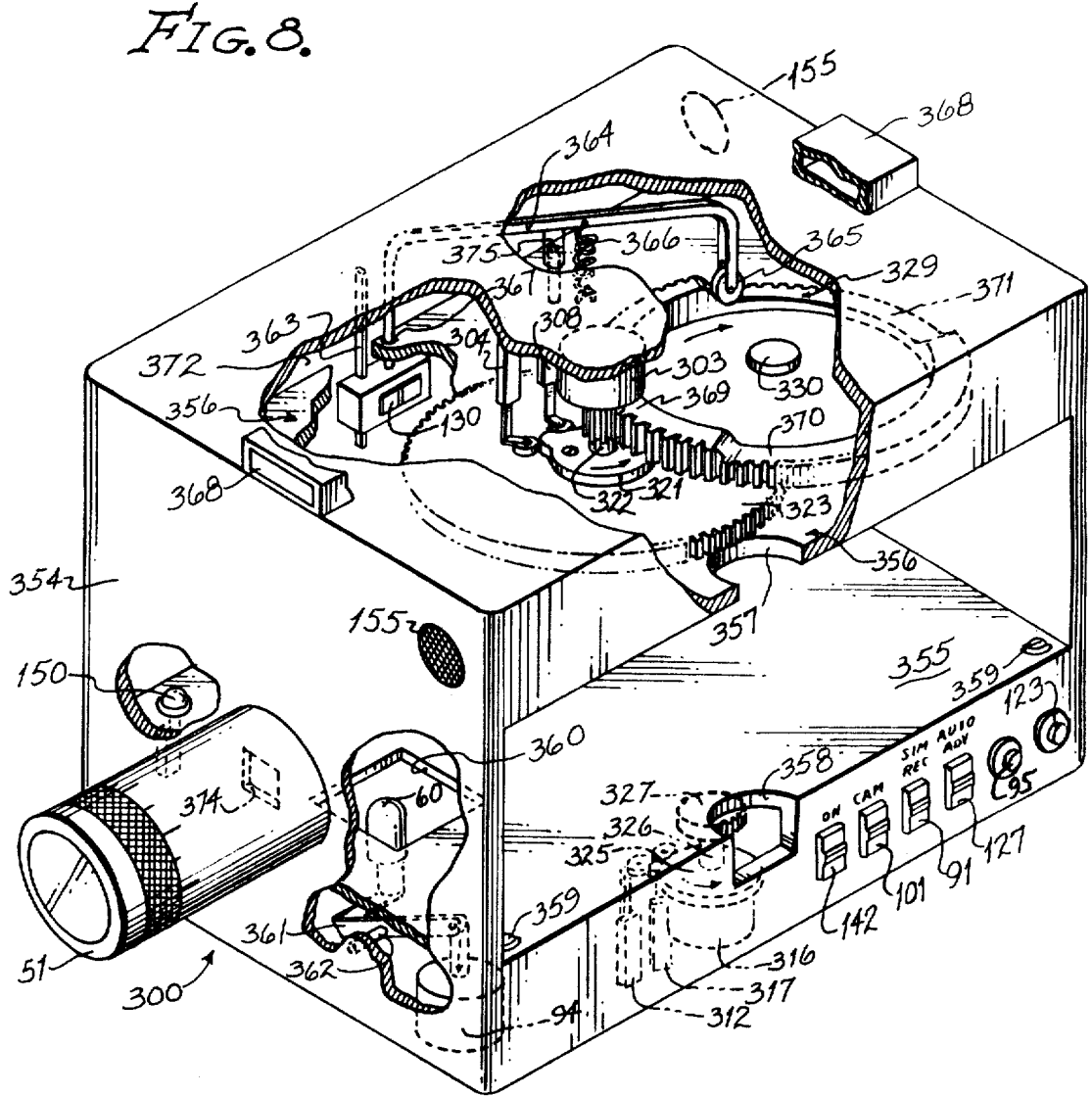
FIG. 8 is a perspective view partially in cross section of another configuration of the invention.
Figure 12:
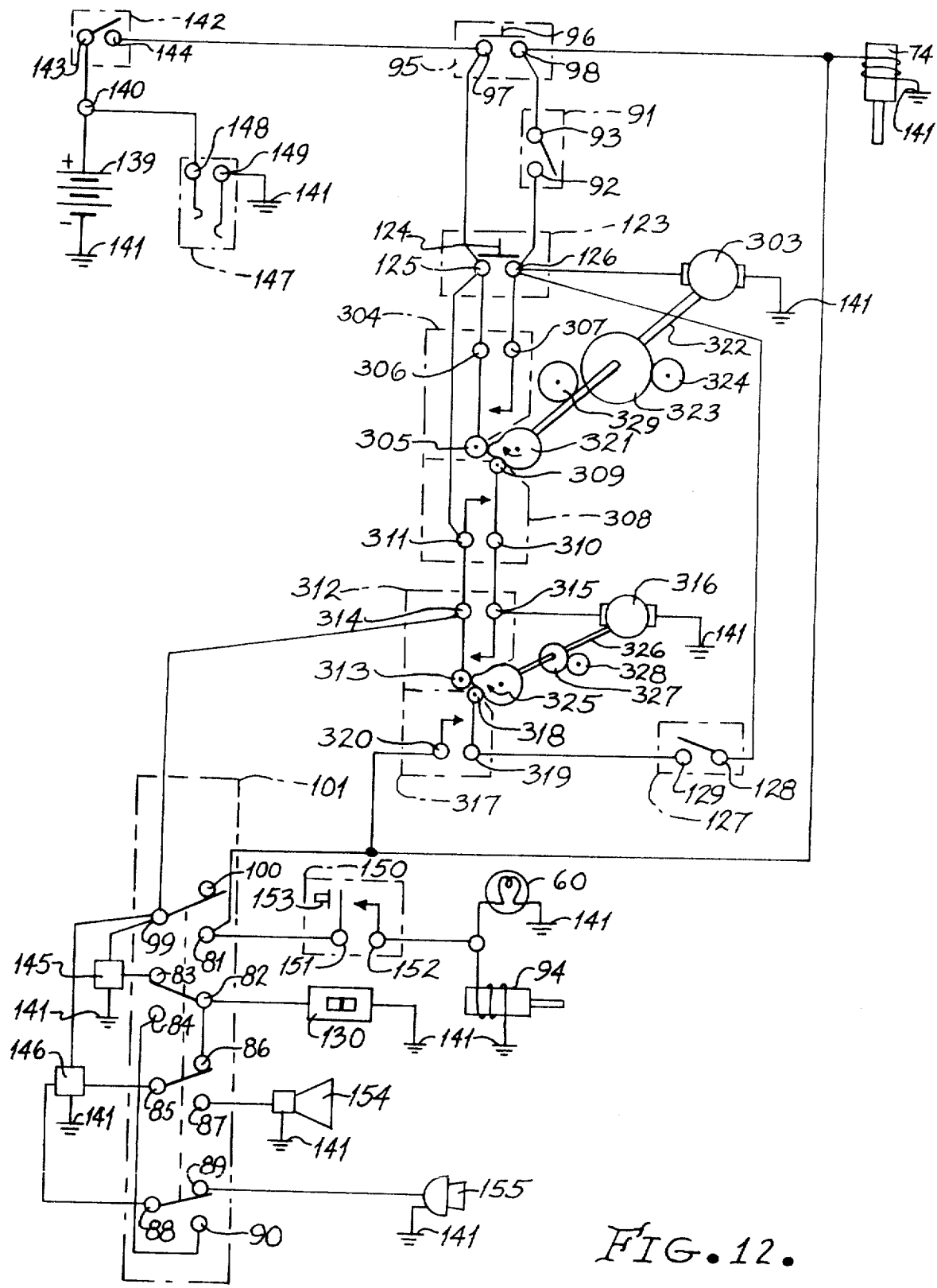
FIG. 12 is an electrical schematic of the second configuration of the invention showing control and signal circuits.

Referring to FIGS. 8 and 12, camera-projector 300 is comprised of case 354 which has three compartments formed by lower panel 355 and upper panel 356. The upper compartment containing the sound components, formed by panel 356 and the upper surface of case 354, the middle compartment in which cartridge comprised of portions 301 and 302 is inserted, and formed by panels 355 and 356, and the lower compartment into which the visual components are contained formed by panel 355 and the lower surface of case 354. Panel 355 has cutout 358 for admitting drive shaft 328 of film strip transporter 331 of the cartridge for cooperation with frame advance timing gear 327, and panel 356 has cutout 357 for admitting drive shaft 324 of tape transporter 345 for cooperation with sound tape drive gear 323. Panel 355 has two snap-in members 359 for snapping into recesses 373 in case portion 301 of cartridge for holding cartridge securely within apparatus 300. Panel 355 also has aperture 360 for injection therein of projection lamp 60, and has an extension of microswitch 150 extending into compartment for depressing said extension when the cartridge is inserted by means of the lower face of the cartridge case. It is noted that a safety feature is included in circuit arrangement so that energizing lamp 60 and solenoid 94 can only occur when switch 101 is in the projector mode, so that in the camera mode, even when switch 150 is activated by inserting the cartridge, solenoid 94 and lamp 60 do not energize. The compartment formed by the lower face of case 354 and panel 355 has mounted therein switches 91, 101, 127 and 142, and pushbuttons 95 and 123. Also mounted therein is frame advance motor 316, which has mounted on its shaft 326 the timing cam 325 of the frame advance motor and the timing gear 327 of the frame advance motor. Follower 313 of frame advance control switch 312 normally cooperates with the high portion of cam 325, and follower 318 of automatic projection programming switch 317 normally cooperates with the low portion of cam 325. Both switches 312 and 317 are located in the lower compartment. Also found in the lower compartment and mounted to the base of case 354 is solenoid 94 the armature of which is pivotably connected at one end to projector lamp injection member 361 and at the other end to socket for holding projection lamp 60. Member 361 pivots about pivot pin 362 when solenoid 94 is actuated. Other electronic components such as amplifier 146, oscillator-modulator 145, battery 139, loudspeaker 154, and jack 147 for inputting external DC power therein, are located in this compartment.

The middle compartment into which the cartridge is injected has an aperture 374 in the front face of case 354 through which photographic images are communicated between the optical assembly 51 and endless film strip 333.

The upper compartment has sound tape drive motor 303 affixed to the upper surface of case 354. This surface may be a separate panel forming the upper surface of case 354 and affixed to the case mechanically; the lower surface of case 354 may also be separate panel mechanically affixed thereto. Also affixed to the upper surface of case 354 in the upper compartment is sound tape cycle control switch 304 with its follower 305 normally cooperating with the high portion of timing cam 321 of sound tape drive motor. This timing cam is affixed to shaft 322 of sound tape drive motor. Also normally cooperating with the low portion of cam 321 is follower 309 of frame advance start switch 308 which is affixed to the upper surface of the upper compartment. Sound tape drive gear 323 is mechanically affixed to shaft 322 and is also supported by screws which anchor it to cam 321 so that cam 321 and gear 323 always rotate in synchronism. A portion of shaft 322 has a gear member thereon or is formed with gear teeth therein for engagement with gear teeth of a gear cam 329. Gear teeth are provided around the peripheral circumference of said gear cam and whenever shaft 322 rotates so does gear cam 329 as well as cam 321 and gear 323. Gear cam 329 has shaft 330 at its center about which said gear cam rotates. One end of shaft 330 is affixed within panel 356 for support thereof. The end of shaft 322 is supported in a sleeve bearing in panel 356 (not shown for simplicity) so as to provide very stable and balanced movement of gear 323 and gear cam 329. The upper surface of gear cam 329 has elevation levels 369, 370, and 371. Follower 365 attached to one end of track shift member 364 cooperates with the elevation levels of cam gear 329. At the normal starting point of tape 347 of cartridge portion 302, also defined by the lower portion of the rise between elevation level 371 and 369, follower 365 initially is at rest in readiness to rise to the highest elevation portion 369 on start of either the record or reproduce mode. The center of track shift member 364 has one end of a telescoping cylindrical rod 375 attached thereto, the other end of rod 375 being attached to panel 356. The two portions of rod 375 slide with respect to each other up and down with the movement of member 364, and give member 364 mechanical support. Also attached at the center of member 364 is urging spring 366 the other end thereof being attached to panel 356. The function of this spring is to urge follower 365 against the elevations of gear cam surfaces 369, 370 and 371. The other end of member 364 extends through aperture 367 in panel 356 and is affixed to head 130, thereby making head 130 responsive to the up or down motion of follower 365 as it follows the contour of the gear cam. In order to provide support and alignment of head 130, a cutout is provided at the rear thereof for slidable engagement with a rail guide 363 affixed to the rear wall 372 of case 354. The rail guide 363 may also have the shape of an I-beam, the protrusions of the I-portion which is within the cutout of head 130 fitting into additional slots within this cutout as to prevent any other motion of the head 130 except the up and down motion thereby enhancing alignment of the head and the sound track. Rail guide 363 is for the most part within the confines of the center compartment and head 130 is totally within the confines of the center compartment. Also in the upper compartment of the camera-projector are mounted two microphones 155 connected in parallel, one microphone at the front surface of case 354 for capturing sound from the object being photographed and the other microphone at the rear surface of case 354 for supplying sound by the operator of the camera-projector to provide the necessary legend concerning the image photographed. Optical assembly 51 including shutter means (not shown) is mounted on the front surface of case 354 aligned with aperture 374 for communication of images to film 333 when in the camera mode or for communication of images from film 333 when in the projector mode. Solenoid 74 being a part of the shutter for actuating same is located within confines of the optical assembly 51 and hence is only shown schematically in FIG. 12. Such matters as viewer, rangefinder and automatic shutter speed and iris adjustment which may be made electrically may be within the cylindrically shaped member 368 or may be arranged to be located within the upper compartment by reorientation of some of the components therein. It should be noted that for simplicity of illustration the ratio of the cam gear diameter with respect to the geared portion of shaft 322 diameter is shown smaller than would normally be encountered. The choice being to make the gear shaft 322 diameter smaller or make the cam gear 329 diameter larger so that it would take as many full rotations of shaft 322 as the desired number of image frames and accompanying sound tracks and this number of shaft 322 revolutions would revolve the cam gear 329 one full revolution.

STRUCTURAL RELATIONSHIPS OF THE CARTRIDGE TAILORED TO THE SECOND CAMERA-PROJECTOR CONFIGURATION

Figure 11:
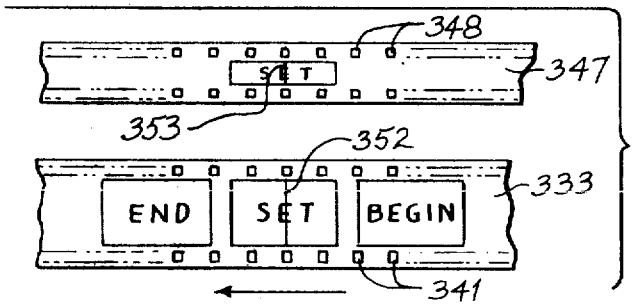
FIG. 11 is a plan view of portions of film strip and sound tape showing alignment frames with hairlines thereon as well as leader frames at the beginning and end of the film strip.

Referring to FIGS. 9, 10 and 11, it is seen that this cartridge is comprised of two portions, a film portion 301 and a sound tape portion 302. The film portion of the cartridge is comprised of case 334 which has aperture 339 for communicating images to and from a film strip 333 therein. The film strip is an endless film strip with sprocket holes therein for translation and guidance of the film strip. This film strip is mounted film strip rotatable roller cylinders 332. The roller cylinders may have sprockets 376 thereon or may have flanges to prevent the film strip from jumping off the cylinders. However, the film strip transporter 331 which is rotatable when shaft 328 extending from case 334 thereof is rotated for translating the film strip by means of sprockets 376 engaging sprocket holes 341 in the film strip, must have sprockets for translating film strip 333. The cylinders 332 are spaced internally to cartridge portion 301 and rotatably affixed to the base of case 334 and so spaced so as to zigzag a maximum length of film therein. Aperture 339 may be closed by a slidable cover 338 which slides in grooves provided in aperture 339 and in case 334 so as to block off any light from entering this aperture and fogging the film prior to film development. Also the base of case 342 has aperture 337 for enabling injection of projection lamp 60 therein during the projector mode so as to illuminate the image on the film and project same through aperture 339, aperture 374 and optical assembly 51. During the camera mode, slidable cover in the base of case 334 is closed so that aperture 337 is blocked from external light. After development of the film, both covers 338 and 336 may be discarded. Cover 335 is at the upper surface of cartridge portion 301 and is made to snap in for ease in inserting film at time of assembly of portion 301 or for removal if necessary. Cover 325 also has lockin holes 342 for snap-fitting lockin pins 351 of cartridge portion 302 therein. Aperture 339 also has film frame alignment line 340 for aligning hairline 352 on a frame of film strip 333 marked SET, therewith. It is noted that at least two other frames, one frame on either side of the SET frame are marked respectively BEGIN and END. The three frames, SET, BEGIN and END, are leader frames and there is no intent that these frames have any photographic images except the notations therein to provide for alignment of the film when installed in the cartridge or for readjustment thereafter if necessary, and to advise the viewer on projection operation of the beginning of the film and when the last film has been viewed, as well as providing protection against fogging of the film if cover 338 is accidentally removed prior to injection into the camera-projector apparatus. Also it provides against possibility of misalignment if shaft 328 is accidentally moved. Another aspect of cover 338 is that it may have a colored plastic transparent window at its center so as to exhibit the size of one frame, thereby enabling alignment with cover 338 in position where it covers aperture 339. The color of the window selected must prevent fogging of film. Of course upon manufacture, both cartridge portions 301 and 302 are snapped together and drive shafts 324 and 328 are provided with a sturdy plastic hood or otherwise protected in a shipping container against moving accidentally. It should be remembered that due to the mass provided by the film and the roller cylinders and the transporter itself, it would take some degree of rotational torque to rotate shaft 328 and shaft 324, so that the likelihood of self rotation particularly with protection provided is very small. Cartridge portion 302 has a case 343 and has aperture 349 for acceptance therein of record-reproduce head 130. Case 343 has cover 344 at its upper surface for installation of endless magnetic tape 347 therein. Tape 347 has sprocket holes 348 for engagement with sprockets 376 on tape transporter 345 and on rotatable cylinders 346. Cylinders 346 are rotatably affixed to the base of case 343 and these cylinders may have flanges instead of sprockets so as to prevent tape 347 from jumping off during transportation. However, tape transporter 345 must have sprockets so as to guide and translate tape 347 when shaft 324 extending through cover 344 externally from case 343 is rotated. The upper end of film strip transporter 331 is supported by means of its shaft being inserted in a depression within cover 335 (not shown due to cutaway section) and the lower end of film strip transporter 331 supported by means of shaft 328 extending through the thickness of the base of case 334. Likewise, the lower end of tape transporter is supported by its shaft extending into a depression in the base of case 343, the upper end thereof supported by virtue of shaft 324 extending through the thickness of cover 344. Shafts 324 and 328 which extend from their respective cases are geared or grooved for cooperation with drive means for driving same. Aperture 349 has an alignment line 350 thereon for aligning the sound tape so it is exactly in synchronization with the film strip prior to injection of cartridge in apparatus. Magnetic tape 347 also has a SET frame in the center thereof there being alignment hairline 353 for alignment with hairline 350 by manually rotating shaft 324. This alignment is of course also provided for at the time of manufacture but since no exposure as in the undeveloped film strip is possible, aperture 349 does not require a cover. Upon alignment of both cartridge portions 301 and 302 under dark room conditions, cartridge portions are snap fitted together by lockin pins 351 locking into holes 342, the protective hood placed over the shafts 324 and 328 or the cartridge installed in a suitable shipping container which acts also as a protective hood for shafts 324 and 328 and covers 336 and 338 are fully inserted as shown in FIG. 9.

SEPARATE CONSIDERATION OF A CAMERA DERIVATION FROM THE SECOND CAMERA-PROJECTOR CONFIGURATION

Referring to FIGS. 8, 9, 10, 11 and 12, it is obvious that by elimination of solenoid 94, member 361, pin 362, projection lamp 60, and lamp inject microswitch 150, the second camera-projector configuration can become a still image camera with a soundtrack for each photographed image.

ELECTRICAL CONSIDERATIONS OF THE SECOND CAMERA-PROJECTOR CONFIGURATION

Referring to FIGS. 8 and 12, the components of the camera-projector are shown in the normal mode or when electrical power is normally not applied thereto. All electrical connections being made by means of wire it will not be necessary to refer to the fact that wire is used in making these connections, in this paragraph. Positive input means of rechargeable battery 139 is electrically connected to positive input terminal 140, the negative terminal of battery 139 being electrically connected to a common negative power and signal return means 141. Means 140 is electrically connected to movable contact 143 of switch 142 and to positive terminal 148 of jack 147. Jack 147 is for connection to an external DC power converter for recharging battery 139 and for operating the projector portion from the standard AC power input mains. The external AC to DC rectifier is a standard part and is not shown. Common power and signal return means 141 is also electrically connected to shutter activate solenoid 74, return of motor 303, return of motor 316, and to terminal 149 of DC power input jack 147. Stationary contact 144 of switch 142 is electrically connected to stationary contact 97 of shutter operate pushbutton 95, to stationary contact 125 of pushbutton 123, to movable contact 306 of sound tape cycle control switch 304, to stationary contact 311 of frame advance start switch 308, to movable contact 314 of frame advance control switch 312, to movable contact 99 of camera-record and projector-reproduce mode switch 101. Stationary contact 81 of switch 101 is electrically connected to stationary contact 320 of automatic projection programming switch 317 and also to the high side of solenoid 74 and to stationary contact 98 of pushbutton 96. Stationary contact 98 is electrically connected to movable contact 93 of shutter activate and simultaneously record sound switch 91. Stationary contact 92 of switch 91 is electrically connected to stationary contact 126 of pushbutton 123, to the high side of motor 303, to stationary contact 307 of sound tape cycle control switch 304, and to movable contact 128 of automatic sequencing switch 127. Stationary contact 129 of switch 127 is electrically connected to movable contact 319 of switch 317. Movable contact 310 of frame advance start switch 308 is electrically connected to stationary contact 315 of frame advance timing switch 312 and to high side of motor 316. All other electrical connections involving switch 101 and components 60, 94, 130, 145, 146, 150, 154 and 155 being identical in connection, structure and function to that of the first camera-projector configuration, and having previously been discussed will not be restated here. Except for identical components with that of the first camera-projector configuration such as switch 101 components, all switch components are shown in the normally open mode including pushbuttons in FIG. 12.

OPERATIONAL RELATIONSHIPS OF THE SECOND CAMERA-PROJECTOR CONFIGURATION

Referring to FIGS. 8, 9, 10, 11 and 12, conditions for the camera-record mode will first be discussed. Upon inserting cartridge 301—302 into camera-projector projector 300, recesses 373 engage with snapin members 359 holding the cartridge securely in the center compartment. Switch 142 is closed so that contacts 143 and 144 cooperate thereby supplying power to the apparatus. Also switch 150 extension is actuated but being in the camera mode no power is provided to solenoid 94 and projector lamp 60. Head 130 now cooperates with the outer surface of magnetic tape 347 at the SET frame of this tape, and in readiness for photographing images, cover 338 is removed at this time and tape is set so that hairline 352 is aligned with line 340. Also shaft 324 sets in cutout 357 and is engaged with gear teeth of gear 323 and shaft 328 sets in cutout 358 and is engaged with frame advance timing gear 327. Switch 101 is in the position shown in FIG. 12 so that oscillator-modulator 145 is connected to head 130 along with output of amplifier 146. Microphone pair 155 are connected in parallel to the input of amplifier 146. Switch 91 is closed so that contacts 92 and 93 cooperate, so that by depressing pushbutton 95 twice with a few seconds delay between each depressing operation (the length of recording time per frame) so that contactor 96 will cooperate with contacts 97 and 98 each time the pushbutton is depressed, the SET and BEGIN frames will be bypassed with their accompanying soundtracks (tape portions) and the apparatus will be in readiness for photographing and recording. It is now possible to have two different choices of recording, one simultaneously with the taking of the photographic image and the other choice first taking the image, then recording the sound. The former choice is desired when the object being photographed emits sound and one wants to acquire that sound. The latter is desired when the operator of the camera-projector wants to supply voice commentaries on the magnetic tape himself. In the former condition, switch 91 will have to be open so that contacts 92 and 93 do not cooperate, in which case by first manually depressing pushbutton 95 so that contacts 97 and 98 cooperate with contactor 96, power will be supplied to solenoid 74 which will operate the shutter taking the photograph. Next, pushbutton 123 is manually depressed momentarily causing contactor 124 to cooperate with contacts 125 and 126 and supply momentary power to motor 303. Motor 303 will start, rotating shaft 322 which upon 5° of rotation (less time than pushbutton 123 can be released), cam 321 will cease to cooperate with follower 305 thereby causing contacts 306 and 307 to cooperate so as to provide power to motor 303 after pushbutton 121 has been released, and said power will continue until a complete 360° rotation of cam 321 occurs, whereby the high portion of cam 321 will cooperate with follower 305 breaking electrical contact between contacts 306 and 307 and stopping motor 303. But during rotation of shaft 322 sound tape drive gear will drive the shaft 324 translating a portion of tape 347 past head 130 so that during this translation period sound is recorded on the tape through microphone 155. Also at the same time due to coupling between shaft 322 and gear cam 329, gear cam 329 will be rotated in the direction shown by arrow thereon, so that follower 365 rises to highest portion of elevation of gear cam being on surface 369 and gear cam rotates an angular distance proportional to one circumference of shaft 322. When cam 321 reaches about 355° of rotation, the high portion thereof cooperates with follower 309 thereby causing cooperation between contacts 310 and 311 and momentarily energizing motor 316 so that motor 316 being a high speed motor compared to motor 303, will rapidly self energize by rotation of shaft 326 causing cam 325 to rotate and contacts 314 and 315 to cooperate thereby providing power to motor 316 until a 360° of cam 325 rotation had been completed. This action causes film strip 333 to be advanced one frame in readiness for the next photograph. In the meantime the remaining 5° of cam 321 rotation had been completed and cam 321 is back to its normal position in readiness for transporting the next length of tape 347. The operational relationship of the audio system from both the record and reproduce standpoints are identical to that described in the first camera-projector configuration and hence need not be repeated here.

The only difference between applying sound by the operator and obtaining sound from the object being photographed lies in the manual activation of pushbutton 95 first, followed by manual activation of pushbutton 123 with switch 91 being open. It is therefore obvious that simultaneous recording with photographing is accomplished when switch 91 is closed so that contacts 92 and 93 cooperate and pushbutton 95 only is depressed. The response of this apparatus will then be exactly as described above.

In the projector-reproduce mode with cartridge inserted and switch 142 closed providing power and with switch 101 positioned in a direction opposite to that shown in FIG. 12, but exactly as the projector-reproduce mode as described in the first camera-projector configuration, and additionally thereto solenoid 74 will be energized and the shutter in the bulb position so as to maintain the shutter open as long as the apparatus is in the projector-reproduce mode. Cover 336 as well as cover 338 are removed and the projector lamp is permitted to enter apertures 360 and 337 thereby illuminating the film. Now for individual combinations of a photographic frame with its related soundtrack, pushbutton 123 will be momentarily manually depressed. After two such operations to remove the frames SET and BEGIN and corresponding sound tape portions, the apparatus will now be ready to project the first image and reproduce its accompanying soundtrack by manually momentarily depressing pushbutton 123. The manner of operation of the apparatus will be identical to that described above from here in, except for getting sound output from loudspeaker 154 instead of inputting sound into microphone 155, and at the end of the cycle involving one photographic frame and sound track the apparatus will be restored to normal in accordance with the component positions in FIG. 12 (except for switch 101 being in opposite position to that shown in FIG. 12). In the event it is desired to program the apparatus so that project-reproduce will occur sequentially for all remaining frames and corresponding soundtracks in the cartridge, then after the first frame is being projected with its accompanying sound, sequencing switch 127 will have to be closed so that contacts 128 and 129 cooperate. Under the conditions when cam 325 will have completed 355° of rotation so that the high portion of the cam cooperates with follower 318 thereby causing contacts 319 and 320 to cooperate which will apply power to motor 303 momentarily restarting this motor and the reproduce-project cycle. This restart action will occur as long as switch 127 is closed, so that upon completion of projection and accompanying reproduction of sound of all the frames, the END frame will be projected at which time the operator will manually open switch 127 and on completion of the END frame projection, the project-reproduce cycle will be completed and the apparatus will come to a stop resetting itself to the normal position as shown in FIG. 12, excepting that the switch 101 will be in a position opposite to that shown in FIG. 12.

I claim:

1. In a still image sound-synchronized camera-projector having optical and sound systems, comprising in combination;
    a cartridge having a film portion comprising a film transportable so as to provide a plurality of image frames, and having a sound track portion comprising a magnetic tape transportable independently of said film for providing a plurality of soundtracks wherein each soundtrack is related to a frame of the plurality of image frames on a one-for-one basis;
    means for translating said image frames one frame at a time and means for translating said tape one soundtrack portion thereof at a time;
    means for providing for completion of translation of any one of the image frames preceding translation of any one of the soundtrack portions corresponding to said any one of the image frames; and
    a soundtrack multiplier, comprising:
        a head contiguous to the magnetic tape; and
        means for positioning said head at a plurality of zones along the length of said tape and means for providing an additional plurality of soundtracks within the same zone comprising noninterfering soundtrack configurations for recording a soundtrack in each said configuration or for reproducing said soundtrack therefrom, said means for positioning the head including means for positioning the head at each discrete soundtrack configuration comprising a driven cam having a plurality of elevated portions of different elevations, and a member linked to said head, one end thereof which cooperates with said elevated portions thereby causing said member to position said head at said plurality of zones.

2. In combination, a still image camera-projector having optical and sound systems, comprising:
    cartridge means, comprising:
        a first cartridge;
        film-transporting means in said first cartridge;
        first guiding means in said first cartridge;
        an endless filmstrip on said film-transporting means and on said first guiding means, the flimstrip being adapted for guidance by the first guiding means and transportation by the film-transporting means;
        a second cartridge;
        tape-transporting means in said second cartridge;
        second guiding means in said second cartridge; and
        an endless magnetic tape on said tape-transporting means and on said second guiding means, the tape being adapted for guidance by the second guiding means and transportation by the tape-transporting means; and
    a light source injectable in an aperture of the first cartridge for providing illumination of images comprising photographic frames of the filmstrip for projection of the images through said optical system during the projection mode of the camera-projector; and
    a soundtrack multiplier, comprising:
        a head contiguous to the magnetic tape; and
        means for positioning said head at a plurality of locations in at least one direction transverse the width of said tape for providing a corresponding plurality of soundtrack zones on said tape, each said soundtrack zone being divided into soundtrack areas which are provided for recording soundtracks in said soundtrack areas or for reproducing said soundtracks therefrom.

3. The apparatus as stated in claim 2, including a linear scanner for transporting said head along a predetermined path and for returning said head to its initial starting point, comprising:
    a first pair of arms for guiding scanning motion of said scanner, one end of each thereof describing a circular path;
    a second pair of arms pivotably connected at each of their first ends to said head, and each of their second ends pivotably connected respectively to each of the other ends of said first pair of arms, so that upon activation of said scanner said head is displaced within a soundtrack area in proportion to the angular displacement of at least one of said first pair of arms;
    means for driving said scanner;
    means for automatically controlling a path of translation of said head and for providing for the return of said head to its initial start location consistent with said scanning motion; and
    means for automatically stopping said scanner at the termination of transportation of said head.

4. The apparatus as stated in claim 2, including:
    programming means for advancing said filmstrip, one of the photographic frames thereof at a time, and for advancing said tape, one of the soundtrack areas at a time, whereby each advancement of one of the soundtrack areas follows each advancement of one of the photographic frames.

5. The apparatus as stated in claim 4, including:
    means for advancing a second of the photographic frames and a second of the corresponding soundtrack areas sequentially after advancing a first of said photographic frames and a first of the corresponding soundtrack areas.

6. The apparatus as stated in claim 5, including:
    means for driving said film and tape-transporting means.

7. The apparatus as stated in claim 6, wherein:
    the first cartridge has an image communication window with a first registration mark thereon for alignment of the filmstrip with said first registration mark;
    the second cartridge has a head admitting window with a second registration mark thereon for alignment of the magnetic tape with the second registration mark; and
    the filmstrip has begin and end identifying frames and a filmstrip alignment frame between the begin and end frames for alignment with the image communication window and for identifying the starting and stopping locations of the filmstrip.

8. The apparatus as stated in claim 2, including:
    a first removable cover retained by the first cartridge for providing closure of the aperture during the photographing mode of the camera-projector or when the cartridge is removed from the camera-projector, said first cartridge having an image communication window; and
    a second removable cover retained by the first cartridge for providing closure of the image communication window during the photographing mode of the camera-projector or when the cartridge is removed from the camera-projector.

9. The apparatus as stated in claim 8, including:
    means adapted to the first and second cartridges for interlocking same.

10. The apparatus as stated in claim 2, wherein the means for positioning said head comprises:
    means for guiding said head while being positioned;
    a driven cam having a plurality of elevated portions of different elevations; and
    a member linked to said head and having a follower at one end thereof which cooperates with said elevated portions thereby causing said member to be responsive to orientation of said member for positioning said head at said plurality of locations.

11. The apparatus as stated in claim 9, wherein:
    the soundtrack area is transported past said head smoothly; and
    the photographic frame corresponding to the soundtrack area is transported periodically.

12. The apparatus as stated in claim 9, wherein:
    the soundtrack area is transported past said head periodically; and the photographic frame corresponding to the soundtrack area is transported periodically.

13. The apparatus as stated in claim 12, including means for scanning said head over the soundtrack area, comprising:
- a first pair of arms for guiding scanning motion of the scanning means, one end of each said arm describing a circular path;
- a second pair of arms pivotably connected at each of their first ends to said head and each of their second ends pivotably and slidably connected respectively to each of the other ends of said first pair of arms so that upon activation of the scanning means said head is displaced within the confines of the soundtrack area in proportion to the angular displacement of at least one of said first pair of arms;
- means for driving the scanning means;
- means for automatically controlling the path of translation of said head and for providing for the return of said head to its initial start location consistent with the scanning motion; and
- means for stopping the scanning means at the termination of transportation of said head.

14. The apparatus as stated in claim 13, wherein said head includes:
- a multiaxial connecting member for providing the pivotable connection of the second pair of arms to said head.